(12) United States Patent
Park et al.

(10) Patent No.: US 7,588,362 B2
(45) Date of Patent: Sep. 15, 2009

(54) BACKLIGHT ASSEMBLY, DISPLAY DEVICE PROVIDED WITH THE SAME, AND METHOD FOR ASSEMBLING BACKLIGHT ASSEMBLY

(75) Inventors: Mun-Soo Park, Suwon-si (KR); Min-Gyu Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 107 days.

(21) Appl. No.: 11/446,993

(22) Filed: Jun. 5, 2006

(65) Prior Publication Data

US 2006/0279946 A1    Dec. 14, 2006

(30) Foreign Application Priority Data

Jun. 8, 2005    (KR) ....................... 10-2005-0048737

(51) Int. Cl.
*G09F 13/04*    (2006.01)
(52) U.S. Cl. .................. 362/612; 362/330; 362/611; 362/613; 362/97.1; 349/61; 349/68

(58) Field of Classification Search ................ None
See application file for complete search history.

(56) References Cited

U.S. PATENT DOCUMENTS

| | | | | |
|---|---|---|---|---|
| 4,254,453 A | * | 3/1981 | Mouyard et al. | 362/240 |
| 2004/0037077 A1 | * | 2/2004 | Showers et al. | 362/249 |
| 2006/0104090 A1 | * | 5/2006 | Lengyel et al. | 362/612 |
| 2006/0187660 A1 | * | 8/2006 | Liu | 362/294 |

* cited by examiner

*Primary Examiner*—Sandra L O'Shea
*Assistant Examiner*—Danielle Allen
(74) *Attorney, Agent, or Firm*—Cantor Colburn LLP

(57) ABSTRACT

A backlight assembly, a display device provided with the backlight assembly, and a method of assembly the backlight assembly are provided. The backlight assembly includes a light source unit having a light source emitting light and a fixing member fixing the light source unit. The light source unit is inserted from an outer side of the fixing member into an opening portion formed in the fixing member to emit light through the opening.

22 Claims, 10 Drawing Sheets

BACKLIGHT ASSEMBLY, DISPLAY DEVICE PROVIDED WITH THE SAME, AND METHOD FOR ASSEMBLING BACKLIGHT ASSEMBLY

This application claims priority to Korean patent application No. 2005-0048737 filed in the Korean Intellectual Property Office on Jun. 8, 2005, and all the benefits accruing therefrom under 35 U.S.C. §119, the contents of which are herein incorporated by reference in their entirety.

BACKGROUND OF THE INVENTION (a) Field of the Invention

The present invention relates to a backlight assembly, a display device provided with the backlight assembly, and a method for assembling the backlight assembly, and more particularly, a backlight assembly having a structure allowed to be simply assembled, a display device provided with the backlight assembly, and a method for assembling the backlight assembly.

(b) Description of the Related Art

As semiconductor techniques are rapidly developed, demands for light, compact display devices increase greatly.

As an example of the display devices, there are liquid crystal display (LCD) devices, plasma display panel (PDP) and organic light emitting display (OLED).

Since such light, compact display devices also display relatively clear images, these display device have been gradually used as a substitute for a conventional cathode ray tube (CRT). Recently, these display devices have been used for display devices such as TV sets, monitors, and mobile phones.

Among then, the liquid crystal display device is a non-emission type device which cannot emit light. The liquid crystal display device mainly includes a liquid crystal display panel and a backlight assembly for supplying light thereto. The backlight assembly includes a light source for emitting light. As an example of the light source, there are a cold cathode fluorescent lamp (CCFL), an external electrode fluorescent lamp (EEFL) and so on. Recently, instead of the lamps, a light emitting diode (LED) has been used.

Due to released heat, the backlight assembly may be easily damaged during operation thereof. Since the light source is fixed in an inner portion of the backlight assembly, the backlight assembly needs to be entirely dismantled in order to repair the disordered light source. After the light source is repaired, the dismantled backlight assembly is assembled again. However, since some parts of the backlight assembly are attached with adhesive, the parts may not be easy to dismantle. In addition, since a large number of parts are included in the backlight assembly, too much time is taken to entirely dismantle the backlight assembly.

Particularly, in a case where defects of the light source are detected during a process for manufacturing the backlight assembly, the backlight assembly must be subject to rework. However, since the backlight assembly is not easy to dismantle, rework time is too long, and tasks of the rework are too complicated.

BRIEF SUMMARY OF THE INVENTION

One exemplary embodiment provides a backlight assembly having a structure allowed to be simply assembled.

Another exemplary embodiment provides a display device provided with the backlight assembly.

Another exemplary embodiment provides a method for assembling the backlight assembly.

In an exemplary embodiment there is provided a backlight assembly including a light source unit having a light source emitting light and a fixing member fixing the light source unit. The light source unit is inserted from an outer side of the fixing member into an opening portion formed in the fixing member to emit light through the opening.

In another exemplary embodiment, the light source may be disposed protruding into an inner portion of the fixing member through the opening portion.

In another exemplary embodiment, only the light source may be disposed protruding through the opening portion.

In another exemplary embodiment, the light source unit may further include a printed circuit board on which the light source is mounted and the printed circuit board may drive the light source.

In another exemplary embodiment, the printed circuit board may be constructed with a metal plate.

In one exemplary embodiment, the metal plate is made of aluminum.

In another exemplary embodiment, the light source unit may further include a step portion formed along a periphery of the light source unit and the step portion may be fixed on outer side of the fixing member.

In one exemplary embodiment, the step portion may be engaged with the fixing member with screws.

In another exemplary embodiment, the fixing member further includes hooks formed on a periphery of the opening portion of the fixing member and the light source unit may be fixed to the fixing member with the hooks In another exemplary embodiment, the step portion is directly adjacent to the fixing member.

In another exemplary embodiment, the fixing member further includes guide rails formed at edges of the opening portion in a predetermined direction so as to surround edges of the light source unit, and the light source unit may be inserted into the guide rails in a sliding manner.

In another exemplary embodiment, the light source unit further comprises a step portion formed along a periphery of the light source unit and may be fixed to the opening portion of the fixing member.

In another exemplary embodiment, the fixing member may include a bottom portion in which the opening portion is formed and a side wall portion which is formed to be extended from edges of the bottom portion, and the opening portion may be formed in the side wall portion and the bottom portion.

In another exemplary embodiment, the backlight assembly may further include a cover member covering the light source unit and fixed at outer side of the fixing member.

In one exemplary embodiment, the light source may be a light emitting diode (LED).

According to another exemplary embodiment, there is provided a backlight assembly including a light source unit having a light source emitting light and a fixing member fixing the light source unit. The fixing member includes a bottom portion and a side wall for surrounding a periphery of the bottom portion. The bottom portion and the side wall are detachable from each other.

In another exemplary embodiment, the bottom portion may be engaged with the side wall by screws.

In another exemplary embodiment, the fixing member further includes hooks and the bottom portion may be engaged with the side wall by the hooks.

In one exemplary embodiment, the fixing member further includes engagement parts formed on the bottom portion and the hooks may be formed on an outer surface of the side wall portion to be engaged with engagement parts In another exemplary embodiment, the engagement parts may include a first engagement part including an engagement hole to be engaged with the hook and a second engagement part disposed to be separated by a predetermined distance from the first engagement part.

In one exemplary embodiment, the side wall portion may be inserted and fixed between the first and second engagement parts.

In another exemplary embodiment, the fixing member further includes an opening portion and the light source unit may be inserted from an outer side of the fixing member into the opening portion and emit light through the opening portion.

According to another exemplary embodiment, there is provided a display device including a panel unit for displaying images, a light source unit including a light source for supplying light to the panel unit and a fixing member for fixing the light source unit and including an opening portion. The light source unit is inserted from an outer side of the fixing member into the opening portion to emit light through the opening portion.

In another exemplary embodiment, the light source unit may further include a printed circuit board on which the light source is mounted, and the printed circuit board may drive the light source.

In one exemplary embodiment, the printed circuit board may be constructed with a metal plate.

In another exemplary embodiment, the light source unit further includes a step portion formed along a periphery of the light source unit and fixed on outer side of the fixing member.

In another exemplary embodiment, the fixing member may further include guide rails formed at edges of the opening portion of the fixing member in a predetermined direction so as to surround the light source unit, and the light source unit may be inserted into the guide rails in a sliding manner.

In another exemplary embodiment, the fixing member may include a bottom portion in which the opening portion is formed and a side wall portion which is formed protruded from edges of the bottom portion, and the opening portion may be formed to pass through the side wall portion and the bottom portion.

In one exemplary embodiment, the panel unit may be a liquid crystal display panel.

According to another exemplary embodiment, there is provided a display device including a panel unit displaying images, a light source unit including a light source supplying light to the panel unit; and a fixing member having an opening portion to fix the light source unit. The fixing member includes a bottom portion on which the opening portion is formed and a side wall for surrounding a periphery of the bottom portion, and the bottom portion and the side wall is detachable from each other.

In one exemplary embodiment, the bottom portion may be engaged with the side wall using screws.

According to another exemplary embodiment, there is provided a method for assembling a backlight assembly. The method includes preparing a fixing member in which an opening portion is formed, inserting a light source unit including a light source from an outer side of the fixing member into the opening portion and detachably fixing the light source unit to the backlight assembly.

In one exemplary embodiment, the inserting the light source unit may include inserting the light source unit in a sliding manner along guide rails formed in edges of the opening portion of the fixing member.

In another exemplary embodiment, the detachably fixing the light source includes fastening the light source unit to the fixing member with a fastening member.

In another exemplary embodiment, the fixing member further includes a first portion and a second portion detachable from each other, the opening being formed in the first portion, and the detachably fixing the light source unit includes fastening the first portion to the second portion with a fastening member.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
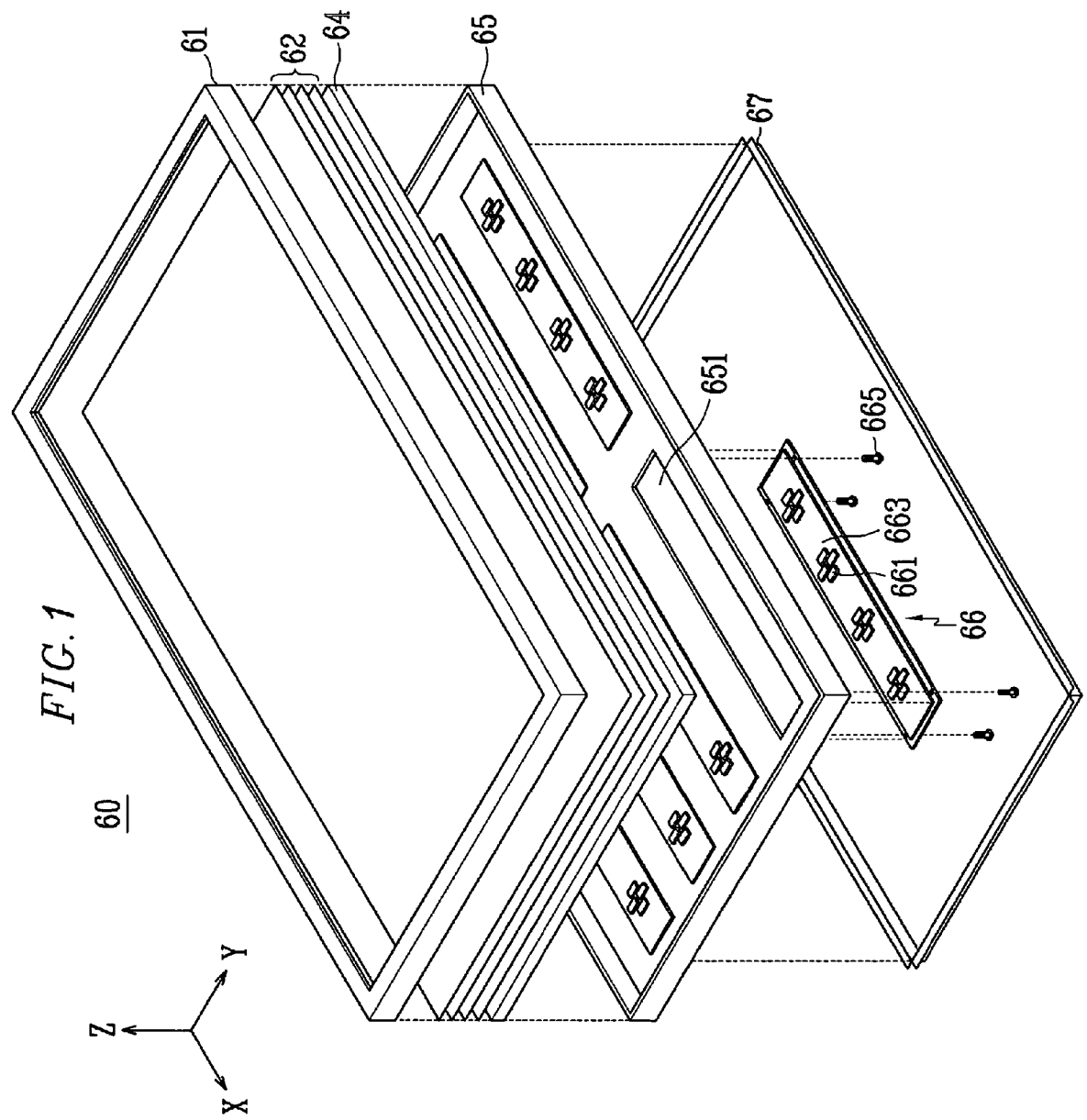
FIG. 1 is an exploded perspective view showing an exemplary embodiment of a backlight assembly according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Now, embodiments of the present invention will be described with reference FIGS. 1 to 10. The embodiments of the present invention are exemplary ones, and the present invention is not limited thereto. FIG. 1 shows an exemplary embodiment of a backlight assembly 60 according to the present invention. The backlight assembly 60 as shown in FIG. 1 is a direct type backlight assembly which is mainly used for a large-sized display device such as an LCD TV. The structure of the backlight assembly 60 shown in FIG. 1 is an exemplary one for the present invention, but the present invention is not limited thereto. Therefore, other structures may be used for the backlight assembly according to the present invention.

The backlight assembly 60 is constructed by assembling a plurality of optical sheets 62, a diffuser plate 64, and a plurality of light source units 66. The backlight assembly 60 further includes a frame member 61 and a fixing member 65 for fixing the aforementioned components. Elements of the backlight assembly 60 are fixed by using the frame member 61 and the fixing member 65. The fixing member 65 includes a bottom portion and side portions protruding in an upward (Z-axis) direction from the bottom portion defining an inner portion of the fixing member 65.

In an exemplary embodiment as illustrated in FIG. 1, the backlight assembly 60 may be substantially frame shaped. For orientation purposes, a Cartesian coordinate system may be used where a first side of the backlight assembly extends along a Y-axis direction, and a second side of the display device extends along an X-axis direction, where the Y-axis is substantially perpendicular to the X-axis and a Z-axis direction is substantially perpendicular to both the X and Y axes.

The light source units 66 includes light sources 661 for emitting light and a printed circuit board (PCB) 663 for driving the light sources 661 mounted thereon. A plurality of the light source units 66 are accommodated in the fixing member 65. In exemplary embodiments, a plurality of the light source units 66 are arrayed in the X-axis and/or Y-axis directions. The light sources 661 may be arranged substantially along a longitudinal direction of the PCB 663.

Alternative exemplary embodiments include configurations where a plurality of wire lines (not shown) are disposed on a rear surface of the fixing member 65 to connect the light source units 66 to external members to the backlight assembly 60. The connection of the wire lines can be easily understood by the ordinarily skilled in the arts, and thus, detail description thereof is omitted. The wire lines from the light source units 66 are connected to inverters (not shown) disposed in a lower portion of a cover member 67. The inverters convert an external power into driving voltages and apply them to the light source units 66.

Referring again to FIG. 1, light sources 661 are mounted on each of the light source units 66. In exemplary embodiments, the light sources 661 may include light emitting diodes (LEDs). The LEDs may be colored LEDS. In one exemplary embodiment, a combination of red, green, and blue (RGB) light emitting diodes may be used. The structure of the light source is an exemplary one for the present invention, but the present invention is not limited thereto. Therefore, other structures may be used for the light source according to the present invention.

Light emitted from the light source units 66 pass through the diffuser plate 64 so as to be uniformly diffused. In order to prevent bright-line defects caused by the light source units 66, the diffuser plate 64 is disposed to be separated by a predetermined distance from the light source units 66.

Light diffused by the diffuser plate 64 passes through a plurality of the optical sheets 62, so that brightness of the light increases. In exemplary embodiments, optical sheets 62 may include a prism sheet to improve straightness of light. Advantageously, light with uniformity and high brightness may be supplied in an upward direction (Z-axis direction) of the backlight assembly 60.

As shown in FIG. 1, the light source units 66 may be inserted from an outer side of the fixing member 65 into opening portions 651 formed in the fixing member 65. The light source units 66 are securely fastening to the fixing member 65 by a fastening member 665, such as screws. In alternative exemplary embodiments, the fastening member to secure the light source units 66 to the fixing member 65 may include adhesive or any of a number of materials as is suitable for the purpose described herein. Once the light source units 66 are fixed to the fixing member 65, the light source units 66 are covered with the cover member 67. The cover member 67 extends to an outer edge or side of the fixing member 65 so as to protect the light source units 66 from external impacts.

In an exemplary embodiment of a method for assembling the backlight assembly 60, the fixing member 65 in which the opening portions 651 are formed is prepared. The light source units 66, including the light sources 661, are inserted from the outer side of the fixing member 65 into the opening portions 651. The opening portions 651 substantially correspond to the light source units 66, such as corresponding to the size and shape of the PCB 663. Finally, the light source units 66 are covered with the cover member 67. Alternative exemplary embodiments may include configurations where the cover member 67 may be omitted as needed.

The light source units 66 may be easily detached from the outer side of the fixing member 65. The light source units 66 may be easily assembled into the backlight assembly 60 and the light source units 66 may be easily detached from the backlight assembly 60 as the light source units 66 are removably attached to the backlight assembly 60. Advantageously, since there is no need to entirely dismantle the backlight assembly 60, efficiency of tasks of the rework can be improved.

Figure 2:
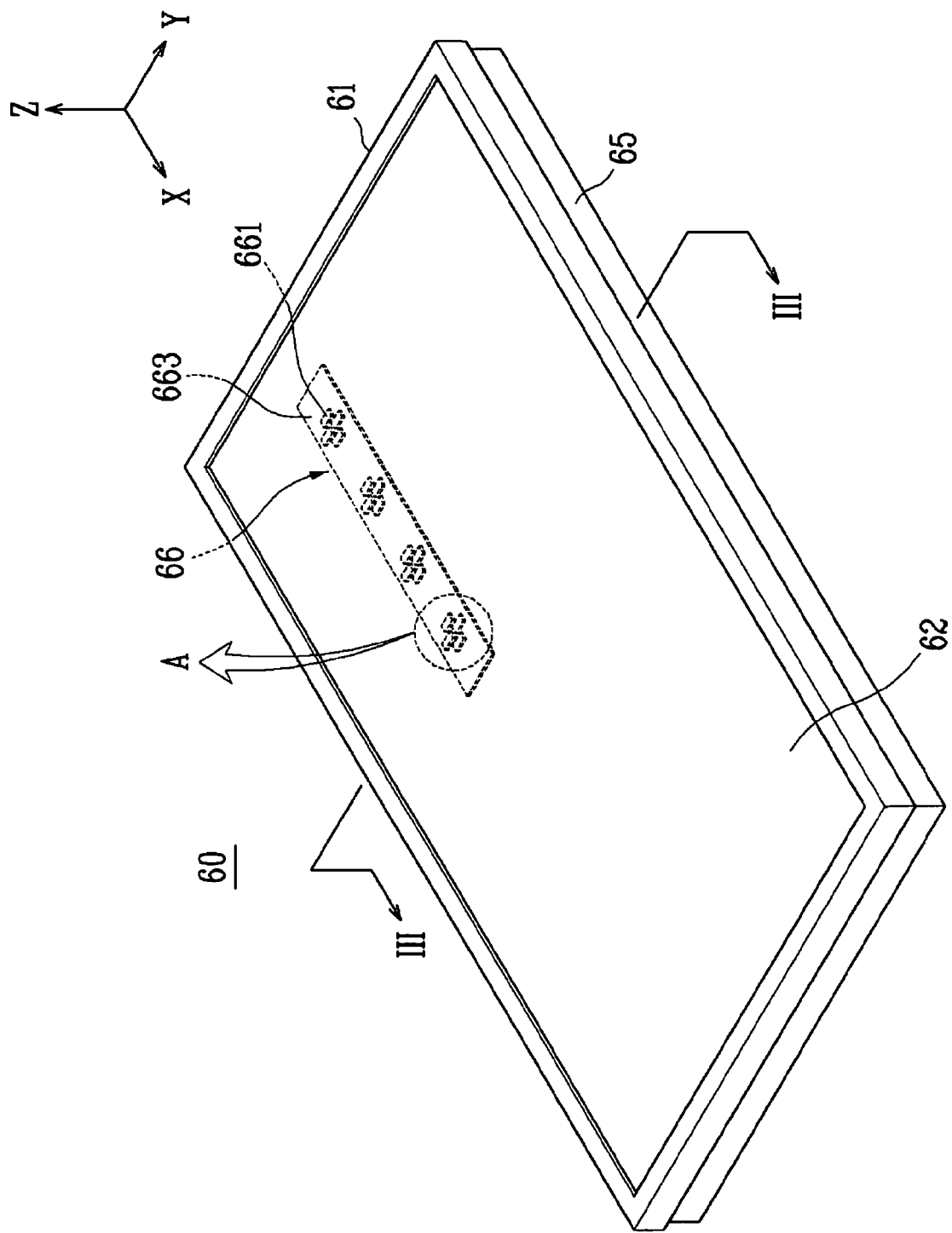
FIG. 2 is an assembled perspective view showing the backlight assembly of FIG. 1.

FIG. 2 shows an assembled state of the backlight assembly 60 shown in FIG. 1. The light sources 661 mounted on the printed circuit board 663 emit light in the upward (Z-axis) direction towards the optical sheets 62. In exemplary embodiments, the printed circuit board 663 may be constructed with a metal plate. In one exemplary embodiment, a metal core printed circuit board (MCPCB) may be used for the printed circuit board 663. In another exemplary embodiment, since a large amount of heat may be released from the light sources 661, the metal plate may be made of aluminum that has a good heat conductivity. Advantageously, since the heat of the light sources 661 is efficiently released through the printed circuit board 663, it is possible to prevent deterioration in characteristics of internal parts of the backlight assembly 60.

Figure 3A:
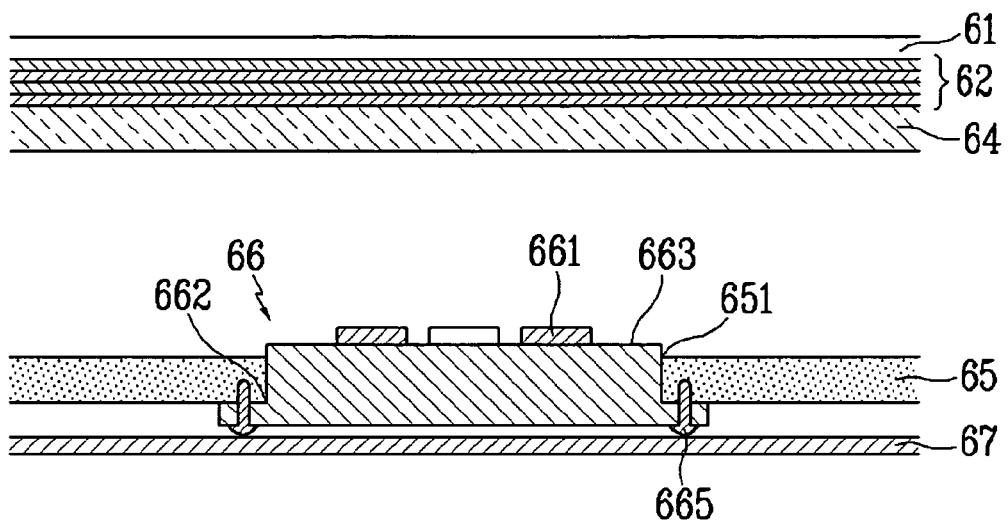
FIG. 3A is a cross sectional view showing an exemplary embodiment of portion A taken along line III-III of FIG. 2.

FIG. 3A is a cross sectional view showing an exemplary embodiment of portion A taken along line III-III of FIG. 2. The light source units 66 are fixed to the outer side of the fixing member 65. The light sources 661 are inserted into the opening portions 651 of the fixing member 65 so as to protrude in the inward direction (or inner portion) of the fixing member 65 and to emit light. Alternative exemplary embodiments may include configurations where wire line patterns are disposed on a surface of the printed circuit board 663 to apply driving voltages to the light sources 661.

A step portion 662 is formed along the periphery of the light source unit 66. When the light source unit 66 is fixed to the fixing member 65, the step portion 662 is closely attached to the periphery of the opening portion 651 of the fixing member 65. That is, the step portion 662 may be directly adjacent to or in contact with the periphery of the opening 651 of the fixing member 65 as shown in FIG. 3A. The light source units 66 may be firmly fixed to the fixing member 65 by using the step portion 662. In one exemplary embodiment, the step portion 662 are attached to the outer side of the fixing member 65 and fastened thereto by using a separate fastening member 665, such as screws, so that the light source units 66 can be securely fixed to the fixing member 65. Since the step portion 662 is closely attached to the fixing member 65, it is possible to efficiently release the heat from the light sources 661.

Figure 3B:
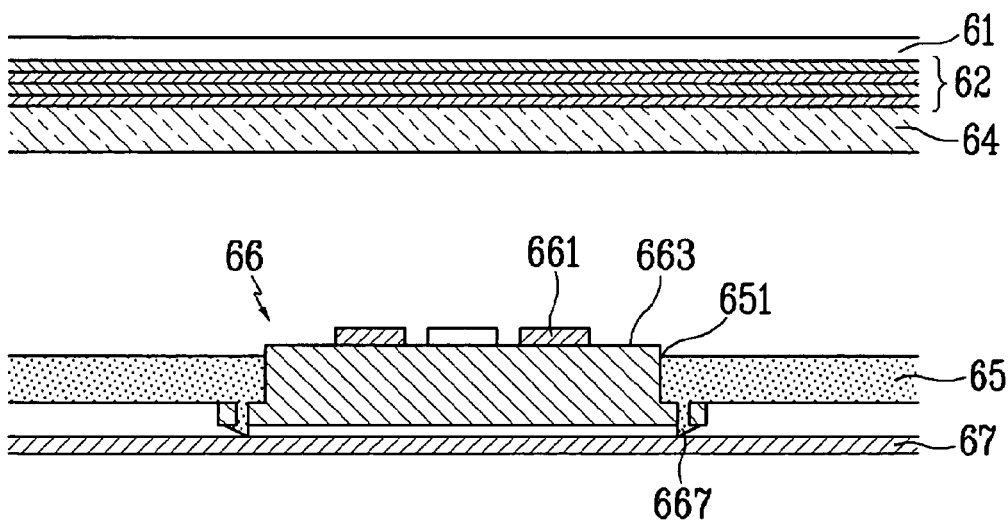
FIG. 3B is a cross sectional view showing another exemplary embodiment of portion A of FIG. 2.

FIG. 3B shows a structure of another exemplary embodiment of a backlight assembly similar to that shown in FIG. 3A. The internal structure of the backlight assembly shown in FIG. 3B is the same as that shown in FIG. 3A except for the assembled structure of the light source units 66 and the fixing member 65. As shown in FIG. 3B, the light source unit 66 is fixed to the fixing member 65 by using hooks 667 formed along the periphery of the opening portion 651 of the fixing member 65. In exemplary embodiments, the hooks 667 may be integrally formed as part of the fixing member 65, such as by injection molding the fixing member 65. Advantageously, the light source unit 66 may be easily assembled (or removably attached) with the fixing member 65 by using hooks 667 without increasing the number of parts.

Figure 4:
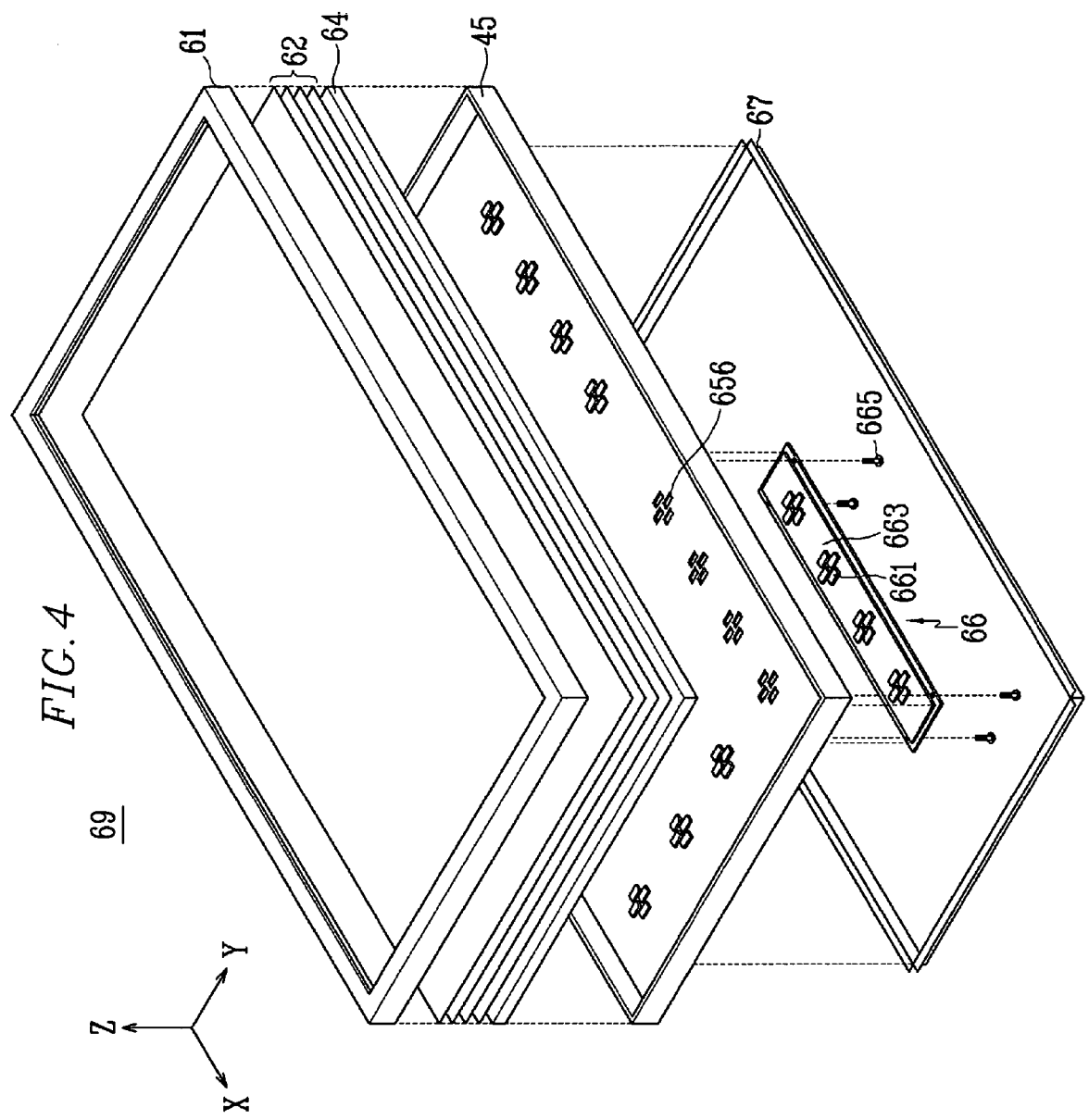
FIG. 4 is an exploded perspective view showing another exemplary embodiment of a backlight assembly according to the present invention.

FIG. 4 shows an exploded state of an exemplary embodiment of a backlight assembly 69 according to the present invention. The backlight assembly 69 of FIG. 4 is substantially the same as the backlight assembly 60 of FIGS. 1-3 except a fixing member 45. Therefore, the same reference numerals denote the same elements, and detailed description thereof is omitted.

In the fixing member 45, opening portions 656 are formed to allow only light sources 661 of the light source units 66 to protrude. Here, opening portions 656 substantially correspond to the size and shape of light sources 661. The printed circuit boards 663 are disposed to the outer side of the fixing member 45 and do not protrude into the inner portion of the fixing member 45. Advantageously, since there are only the light sources 661 in the inner portion of the fixing member 45, it is possible to reduce light loss greatly. Alternative exemplary embodiments include configurations where a reflector sheet (not shown) may be disposed along the light sources 661 so as to further minimize the light loss. In addition, the printed circuit board 663 may be closely attached to the outer side of the fixing member 45 so as to easily release the heat of the light sources 661.

FIGS. 5A and 5B show a structure of a rear surface of another exemplary embodiment of a backlight assembly 70 according to the present invention. The backlight assembly 70 includes a frame member 71 and a fixing member 75. A plurality of light source units 66, such as eight light source units 66 are shown in FIG. 5A. Two upper light source units 66 (relative to the X-axis direction) are shown in a before-assembling state such that the light source units 66 are not yet assembled to guide rails 753, and six lower light source units 66 are in an after-assembling stage such that the light sources 661 are fully inserted into the guide rails 753.

The backlight assembly 70 shown in FIGS. 5A and 5B is similar to the backlight assembly of FIGS. 1-3. Therefore, the same reference numerals denote the same elements, and detailed description thereof is omitted.

Sides of the opening portion 751 of the fixing member 75 are provided with the guide rails 753 in a predetermined direction (X-axis direction), such as along a longitudinal direction of the opening portion 751. The light source units 66 are inserted along the guide rails 753. The structure of the guide rails 753 shown in FIGS. 5A and 5B is an exemplary one, and the present invention is not limited thereto. Therefore, the guide rails 753 may be modified with other structures. Alternative exemplary embodiments include configurations where the guide rails 753 are integrally formed as a part of the fixing member 75 or are separate features, attached to the fixing member 75.

As shown with arrows, the light source units 66 are inserted in a sliding manner along the guide rails 753. The light source unit 66 may be fixed to the fixing member 75 by sliding from a side of the fixing member 75 into the guide rails 753. In exemplary embodiments, the light source units 66 are connected to each other with wire lines.

FIG. 5B shows an exemplary embodiment of cross sectional structure of the light source unit 66 inserted into the guide rails 753 in a sliding manner. The light source unit 66 is surrounded by the guide rails 753 so as to be securely fixed. Step portions 662 are formed in edges of the light source unit 66. The step portions 662 are fixed to the opening portion 751 of the fixing member 75 such that the light source unit 66 is securely fixed to the fixing member 75.

An exemplary embodiment of a method for assembling the light source units 66 to the fixing member 75 in a sliding manner will be described in the following detail. The fixing member 75 includes a bottom portion 75a and a side wall portion 75b surrounding edges thereof. The opening portions 751 are formed in the bottom portion 75a. The side wall portion 75b is formed to be curved or to protrude from the edges of the bottom portion 75a. The opening portions 751 are formed from removing a portion of the bottom portion 75a and the side wall portion 75b. Forming the opening portions 751 essentially forms openings 77 in the side wall 75b surfaces of the fixing member 75 in the X-axis direction, allowing the light source units 66 to be inserted in a direction indicated by an arrow (in the X-axis direction).

Figure 5:
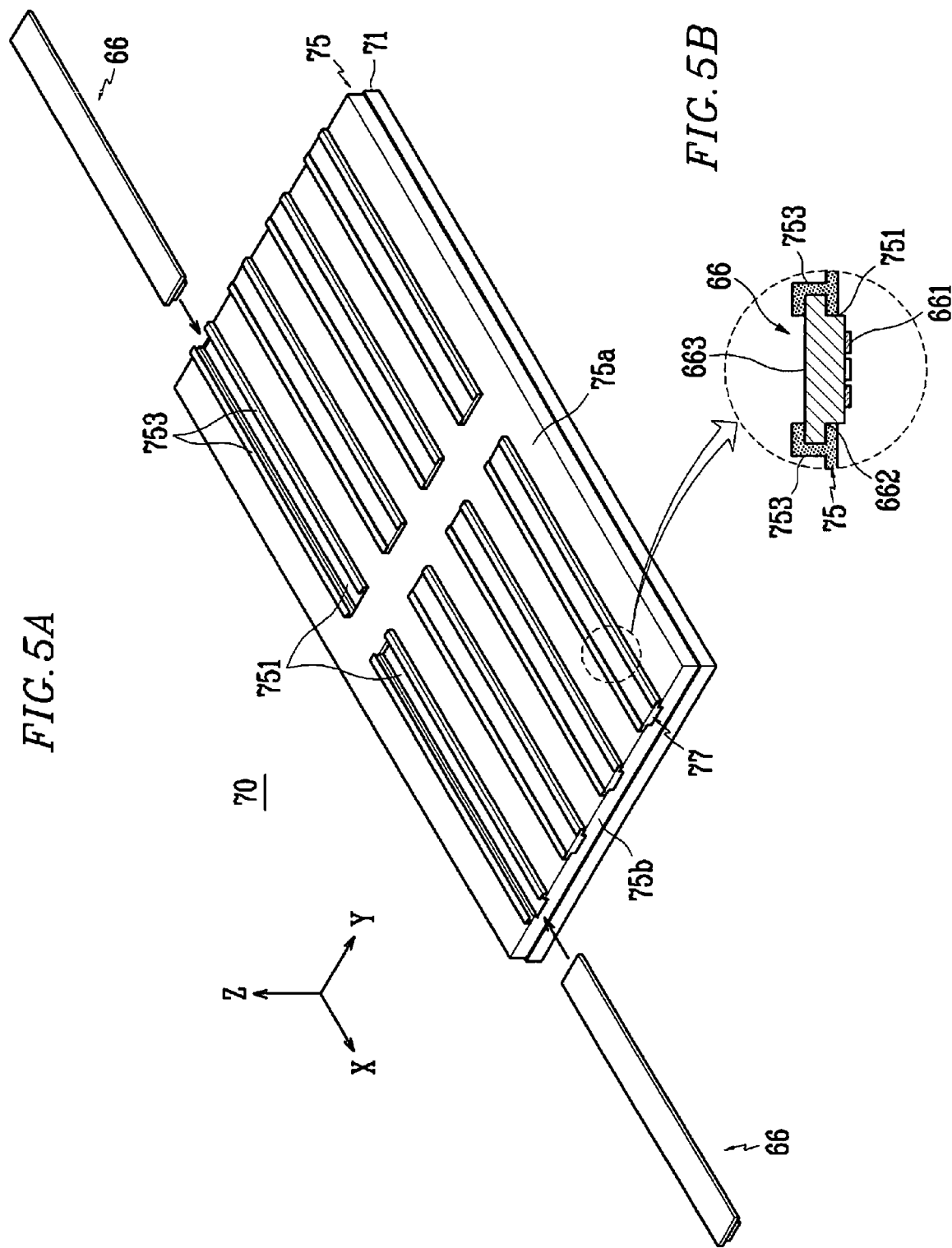
FIG. 5A is a perspective view showing a rear surface of another exemplary embodiment of a backlight assembly according to the present invention.
FIG. 5B is an enlarged cross sectional view showing a portion of FIG. 5A.

In a process of assembling the backlight assembly 70 shown in FIG. 5, the light source units 66 are inserted into the fixing member 75 along the guide rails 753 thereof. Advantageously, the light source unit 66 can be securely fixed to the fixing member 751. In addition, since the light source unit 66 can be inserted after the backlight assembly 70 is assembled, the tasks of the rework are easier to carry out.

Figure 6:
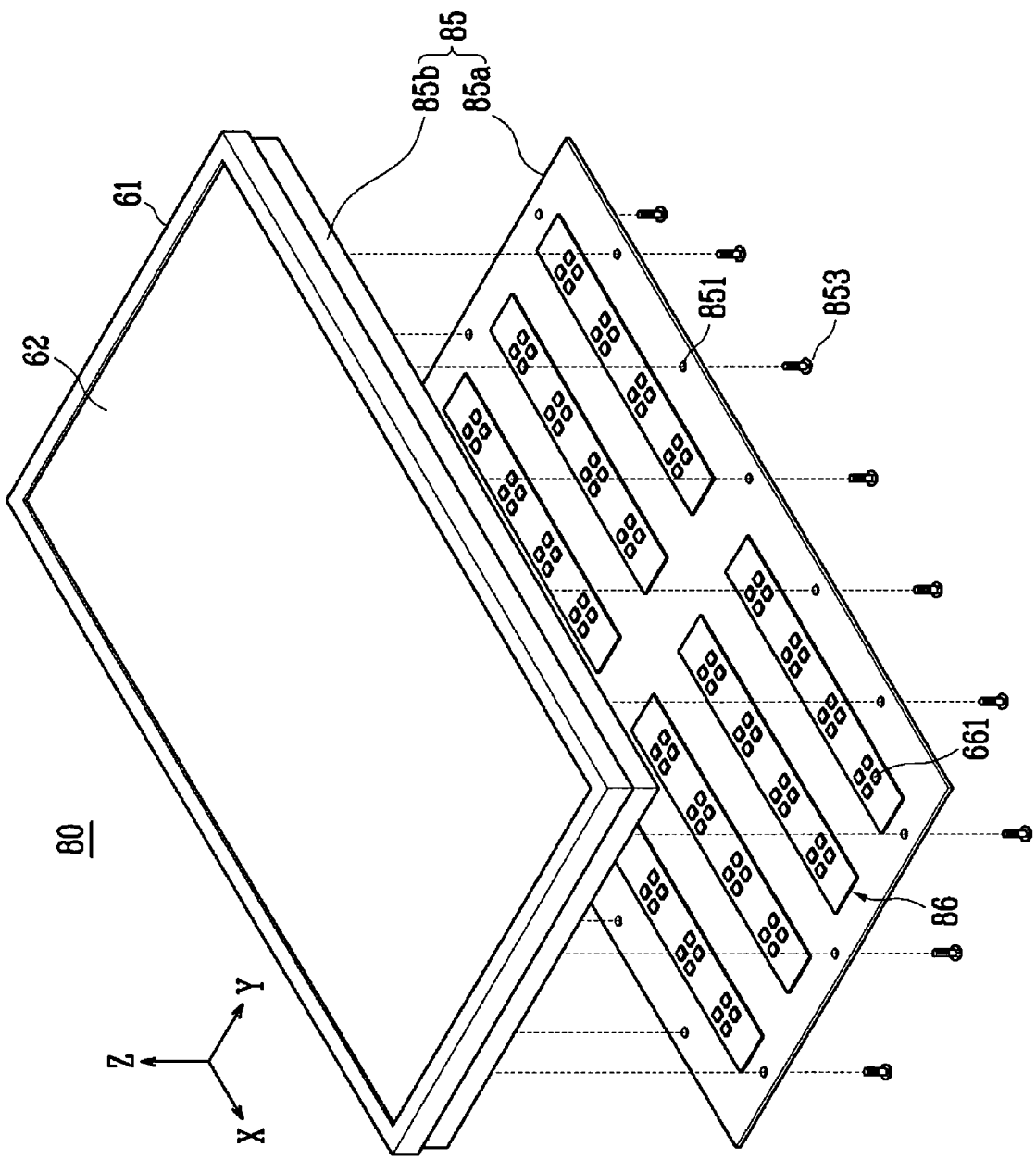
FIG. 6 is an exploded perspective view showing another exemplary embodiment of a backlight assembly according to the present invention.

FIG. 6 shows another exemplary embodiment of a method for assembling a backlight assembly 80 according to the present invention. The backlight assembly 80 is substantially the same as that of FIGS. 1-3. The same reference numerals denote the same elements, and detailed description thereof is omitted.

Referring to FIG. 6, light sources 661 are disposed on a light source unit 86 in a pattern different from those of the aforementioned embodiments. The structure of the light source unit 86 is an exemplary one, and the present invention is not limited thereto.

As shown in FIG. 6, a fixing member 85 includes a bottom portion 85a and a side wall portion 85b. The bottom portion 85a and the side wall portion 85b are detachable from each other. After other parts of the backlight assembly 80 are assembled in advance, the bottom portion 85a may be assembled. The light source units 86 (including the light sources 661) and a portion of the fixing member are removably attached from the remaining parts of the backlight assembly 80.

Light source units 86 are fixed on the bottom portion 85a, and the side wall portion 85b is formed to surround edges of the bottom portion 85a. A plurality of fastener engagement holes 851 are formed on the bottom portion 85a so as to be engaged with the side wall portion 85b by using fastening members 853, such as screws. Advantageously, the bottom portion 85a and the side wall portion 85b can be securely assembled.

Figure 7:
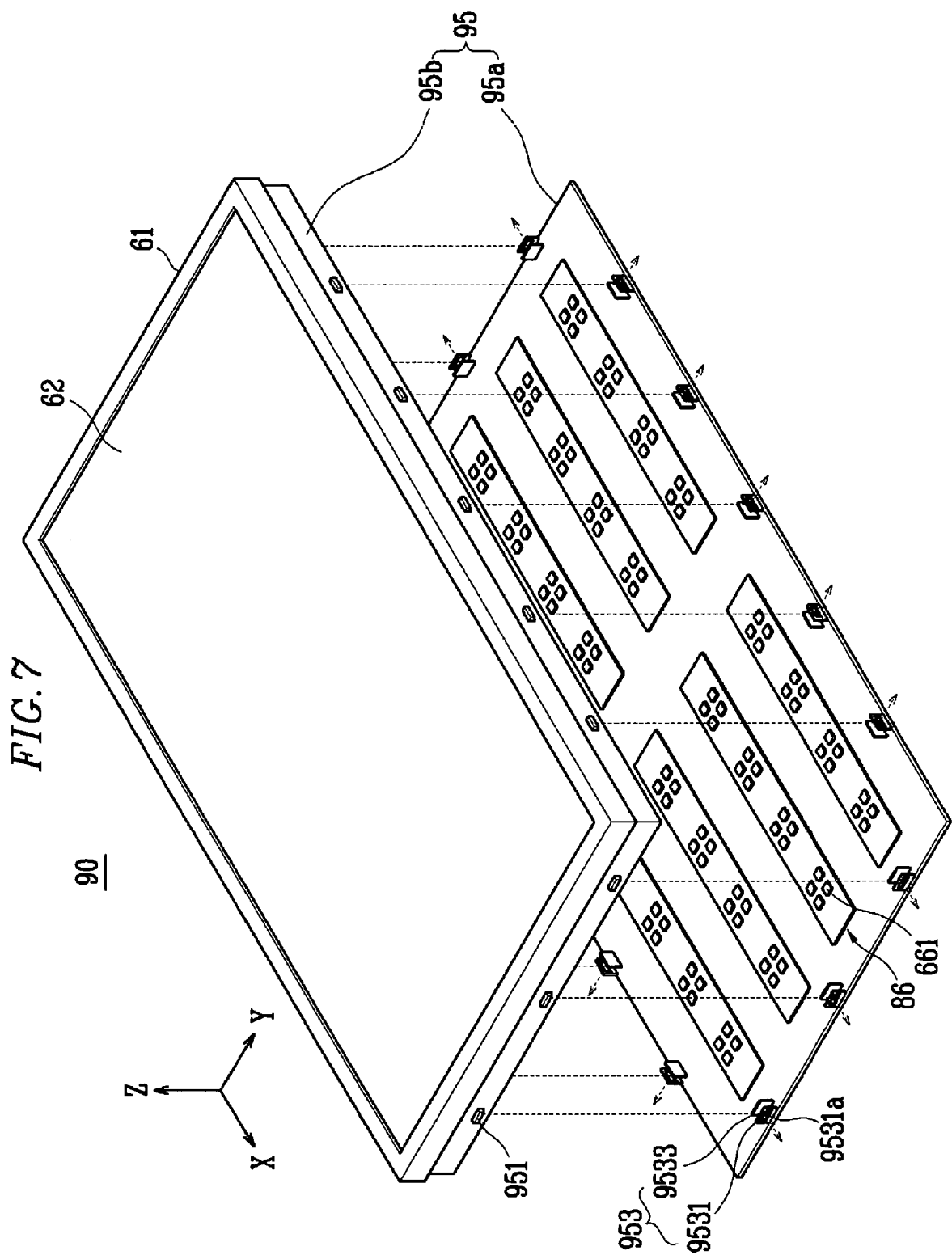
FIG. 7 is an exploded perspective view showing another exemplary embodiment of a backlight assembly according to the present invention.

FIG. 7 shows another exemplary embodiment of a method for assembling a backlight assembly 90 according to the present invention. The backlight assembly 90 is the same as that of FIG. 6. Therefore, the same reference numerals denote the same elements, and detailed description thereof is omitted.

As shown in FIG. 7, a fixing member 95 includes a bottom portion 95a and a side wall portion 95b. The side wall portion 95b is formed to surround edges of the bottom portion 95a. As shown with arrows in FIG. 7, the bottom portion 95a is engaged with the side wall portion 95b by using hooks 951 disposed on the fixing member 95. The structure of the hooks 951 and engagement parts 953 shown in FIG. 7 are exemplary ones, and the present invention is not limited thereto. Therefore, the hooks and the engagement parts may be modified with other structures.

In one exemplary embodiment, the hooks 951 are formed on outer surfaces of the side wall portion 95b, and the engagement parts 953 are formed on the bottom portion 95a. In exemplary embodiments, the hooks 951 may be formed as a part of the fixing member 95, such as by performing an injection molding process or a press molding process on the side wall portion 95b. The hooks 951 are engaged with the engagement parts 953. Since the bottom portion 95a is removably attached to the remaining elements of the backlight assembly 90 and the light source units 86 are fixed to the bottom portion 95a of the fixing member 95, the light source unit 86 can be easily detached from the fixing member 95.

As illustrated in FIG. 7, the engagement parts 953 includes first and second engagement parts 9531 and 9533. An engagement hole 9531a is formed in the first engagement part 9531 to be engaged with the hook 951. The second engagement part 9533 is disposed to be separated by a predetermined distance from the first engagement part 9531. The first and second engagement parts 9531 and 9533 are disposed to face each other. The side wall portion 95b is inserted and fixed between the first and second engagement parts 9531 and 9533. Therefore, the side wall portion 95b can be securely fixed to the bottom portion 95a, while still being removably attached.

Advantageously, the light source units 86 can be easily extracted from the backlight assembly 90 without entirely dismantling the backlight assembly 90. Accordingly, the tasks of rework can be simply performed.

Figure 8:
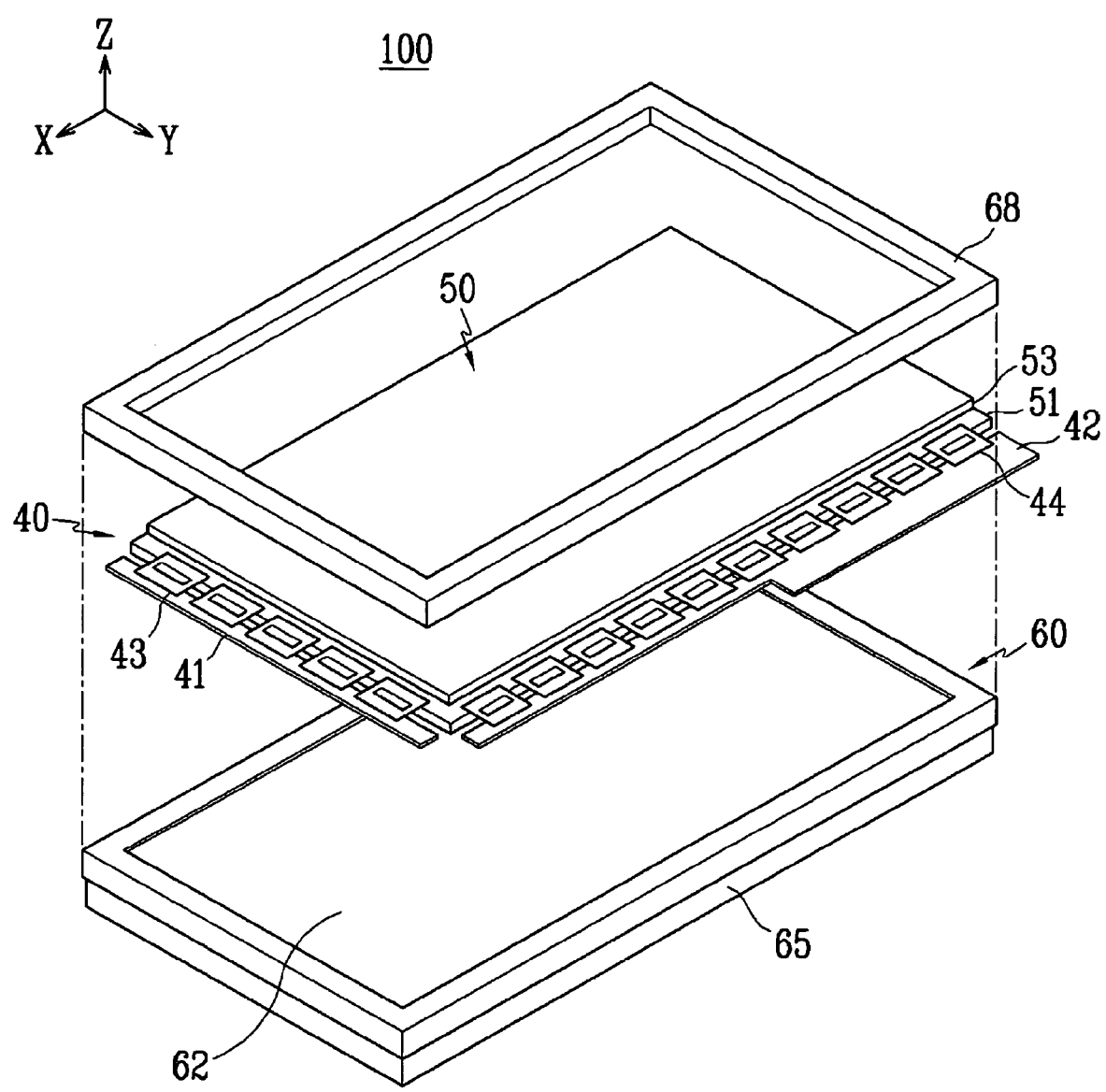
FIG. 8 is an exploded perspective view showing an exemplary embodiment of a display device provided with a backlight assembly according to the present invention.

FIG. 8 shows an exemplary embodiment of a display device 100 having the backlight assembly 60. Although FIG. 8 shows the backlight assembly 60 shown in FIG. 1, the backlight assembly is an exemplary one of the present invention, and the present invention is not limited thereto. Therefore, the backlight assemblies according to other exemplary embodiments of the present invention can be used for the display device 100.

The panel unit 50 may employ a liquid crystal display panel. The liquid crystal display panel is an exemplary one of the present invention, and the present invention is not limited thereto.

The display device 100 includes the panel unit 50 and the backlight assembly 60. The panel unit 50 is securely fixed on the backlight assembly 60 by using a frame member 68. A panel unit assembly 40 includes the panel unit 50, driver IC packages (driver integrated circuit packages) 43 and 44, and printed circuit boards 41 and 42. In exemplary embodiments, the driver IC packages may include COP (chip on film), TCP (tape carrier package), or the like. In other exemplary embodiments, the printed circuit boards 41 and 42 may be enclosed in an inner side surface of the frame member 68.

The panel unit 50 includes a TFT (thin film transistor) panel 51 including a plurality of TFTs, a color filter panel 53 disposed over the TFT panel 51, and liquid crystal molecules (not shown) injected between the panels. In exemplary embodiments, polarizing plates may be attached on an upper portion of the color filter panel 53, and a lower portion of the TFT panel 51 to polarize light passing through the panel unit 50.

The TFT panel 51 may include a transparent glass substrate where the TFTs are disposed in a matrix. A source port of each TFT is connected to a data line, and a gate port thereof is connected to a gate line. A drain port of each TFT is connected to a pixel electrode made of a transparent conductive material such as ITO (indium tin oxide).

When electric signals of the printed circuit boards 41 and 42 are input to the gate and data lines of the panel unit 50, the electric signals are transmitted to the gate and source ports of the TFT. According to the input of the electric signals, the TFT turns on of off, so that an electric signal for forming an image is output to the drain port thereof.

On the other hand, the color filter panel 53 is disposed to face the TFT panel 51. The color filter panel 53 is a panel where color filters, such as RGB filters, may be formed by using a thin film formation process. The RGB filters represent predetermined colors when light passes the filters. A common electrode made of ITO is disposed on the entire surface of the color filter panel 53. When a power is supplied to the gate and source ports to turn on the TFT, an electric field is generated between the pixel electrode of the TFT panel 51 and the common electrode of the color filter panel 53. Due to the electric field, alignment angles of the liquid crystal molecules injected between the TFT panel 51 and the color filter panel 53 are changed, so that transmittance of light changes. As a result, desired images can be obtained.

The printed circuit boards 41 and 42 which receive external image signals and apply driving signals to the gate and data lines are connected to the driver IC packages 43 and 44 attached to the panel unit 50. In order to drive the display device 100, the gate printed circuit board 41 transmits gate driving signals, and the data printed circuit board 42 transmits data driving signals. Namely, the gate and data driving signals are applied through the driver IC packages 43 and 44 to the gate and data lines of the panel unit 50. A control board (not shown) is disposed on a rear surface of the backlight assembly 60. The control board is connected to the data printed circuit board 42 to convert analog data signals to digital data signals and apply the digital data signals to the panel unit 50.

Figure 9:
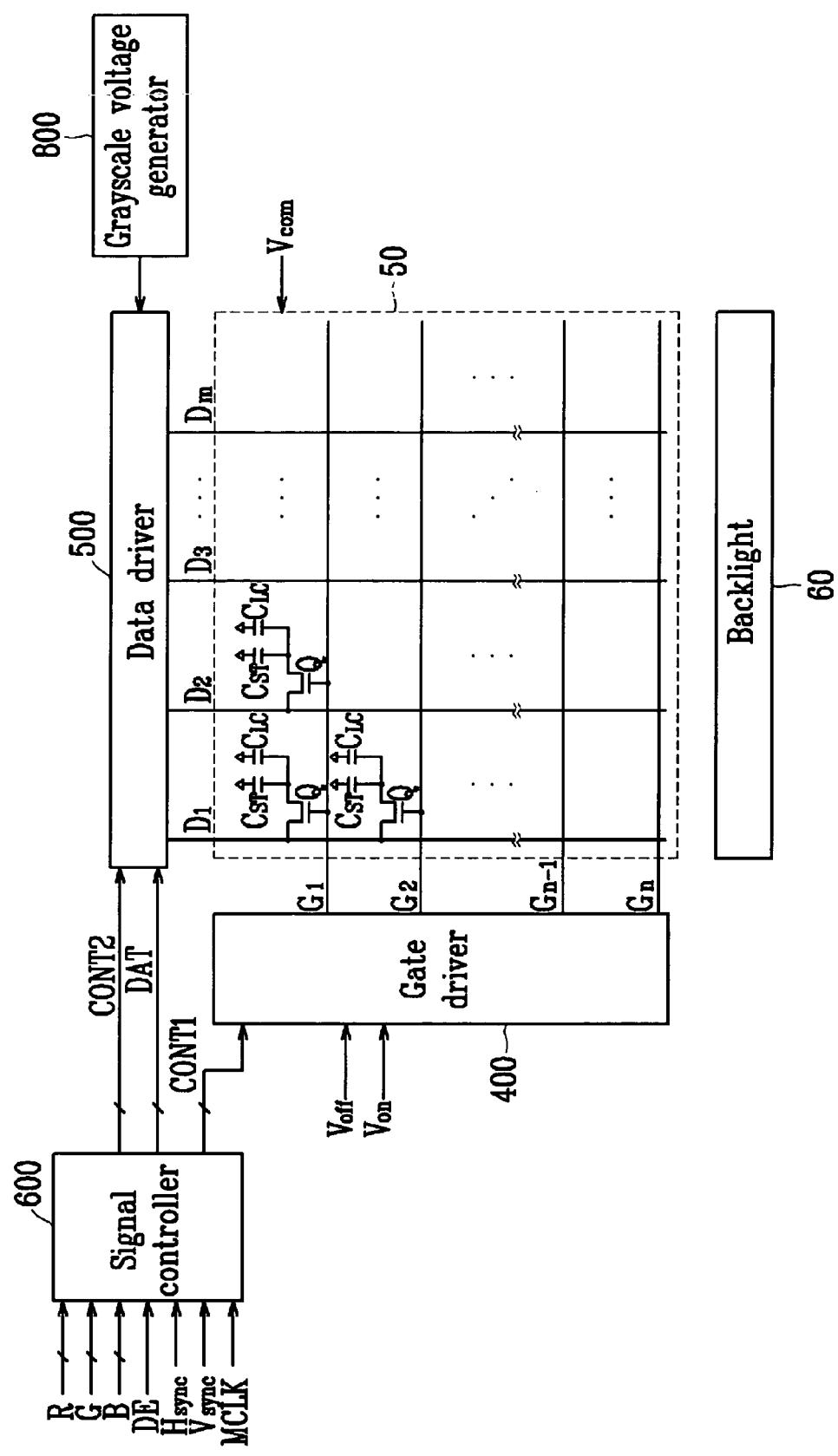
FIG. 9 is an exemplary embodiment of a block diagram for a driving unit included in the display device of FIG. 8.
Figure 10:
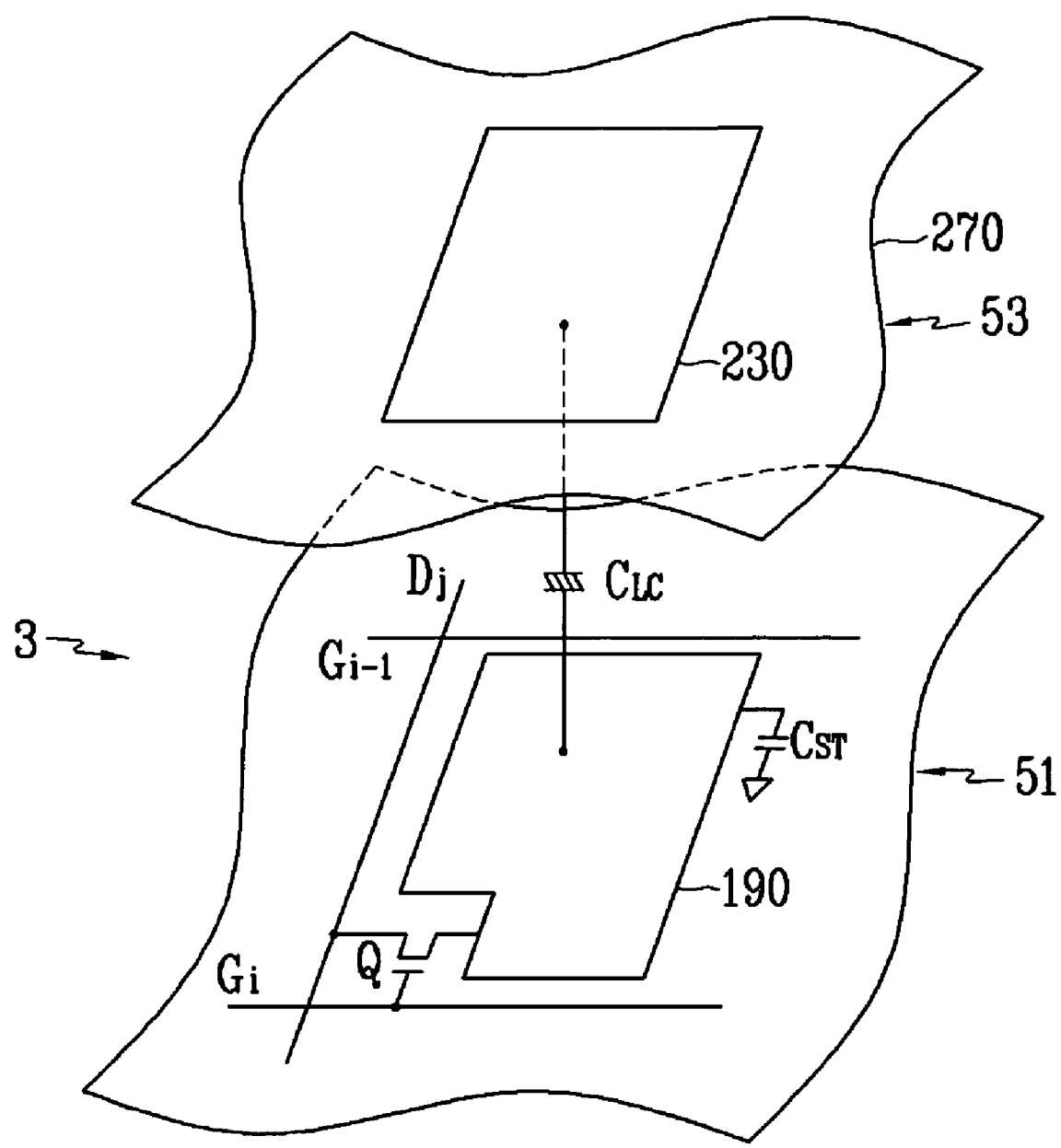
FIG. 10 is an equivalent circuit diagram of an exemplary embodiment of a pixel of the display device of FIG. 8.

Now, operations of the panel unit 50 will be described in detail with reference to FIGS. 9 and 10.

The TFT panel 51 includes a plurality of display signal lines $G_1$ to $G_n$ and $D_1$ to $D_m$. The TFT panel 51 also includes a plurality of pixels which are connected to a plurality of the display signal lines $G_1$ to $G_n$ and $D_1$ to $D_m$ and arrayed substantially in matrix.

The display signal lines $G_1$ to $G_n$ and $D_1$ to $D_m$ include a plurality of gate lines $G_1$ to $G_n$ for transmitting gate signals (sometimes, referred to as a "scan signal") and a plurality of data lines $D_1$ to $D_m$ for transmitting data signals. The gate lines $G_1$ to $G_n$ extend in parallel to each other substantially in a row direction, and the data lines $D_1$ to $D_m$ extend in parallel to each other substantially in a column direction.

Each of the pixels PX includes a switching device Q connected to the display signal lines $G_1$ to $G_n$ and $D_1$ to $D_m$, a liquid crystal capacitor $C_{LC}$ connected thereto, and a storage capacitor $C_{ST}$. The storage capacitor $C_{ST}$ may be omitted as needed.

The switching devices Q is a three-port device such as a thin film transistor disposed in the TFT panel 51 and having a control port connected to one of the gate lines $G_1$ to $G_n$, an input port connected to the data line $D_1$ to $D_m$, and an output port connected to the liquid crystal capacitor $C_{LC}$ and the storage capacitor $C_{ST}$.

Two ports of the liquid crystal capacitor $C_{LC}$ are a pixel electrode 190 of the TFT panel 51 and a common electrode 270 of the color filter panel 53, and the liquid crystal layer 3 interposed between the two electrodes 190 and 270 serves as a dielectric member. The pixel electrode 190 is connected to the switching device Q, and the common electrode 270 is disposed in the entire surface of the color filter panel 53 to receive a common voltage $V_{com}$. Unlike this, the common electrode 270 may be disposed to the TFT panel 51, and in this case, at least one of the two electrodes 190 and 270 may be formed in a shape of line or bar.

The storage capacitor $C_{ST}$ having an auxiliary function for the liquid crystal capacitor $C_{LC}$ is constructed by overlapping a separate signal line (not shown) and the pixel electrode 190 provided to the TFT panel 51 with an insulating member interposed therebetween, and a predetermined voltage such as the common voltage $V_{com}$ is applied to the separate signal line. However, alternatively, the storage capacitor $C_{ST}$ may be constructed by overlapping the pixel electrode 190 and a front gate line disposed just above with an insulting member interposed therebetween.

The signal controller 600 receives input image signals R, G, and B and input control signals for controlling display thereof from an external graphic controller (not shown). As an example of the input control signals, there are a vertical synchronization signal Vsync, a horizontal synchronization signal Hsync, a main clock MCLK, and a data enable signal DE. The signal controller 600 processes the input image signals R, G, and B according to an operating condition of the panel unit 50 based on the input control signals and the input image signals R, G, and B to generate a gate control signal CONT1, a data control signal CONT2, and the like. And after that, the signal controller 600 transmits the generated gate control signal CONT1 to the gate driver 400 and the generated data control signal CONT2 and the processed image signal DAT to the data driver 500.

The gate control signal CONT1 includes a scan start signal STV for indicating output start of the gate-on voltage $V_{on}$ and at least one clock signal for controlling an output period of the gate-on voltage $V_{on}$ and an output voltage.

The data control signal CONT2 includes a horizontal synchronization start signal STH for indicating transmission start of the image data DAT, a load signal LOAD for commanding to apply the associated data voltages to the data lines $D_1$ to $D_m$, and a data clock signal HCLK. The data control signal CONT2 also includes an inversion signal RVS for inverting a voltage polarity of the data signal with respect to the common voltage $V_{com}$ (hereinafter, "the voltage polarity of the data signal with respect to the common voltage $V_{com}$" being abbreviated to a "data signal polarity").

In addition to the control signals CONT1 and CONT2, the signal controller 600 may transmit to the backlight assembly 60 other control signals and clock signals for controlling the operations of the backlight assembly 60.

In response to the data control signal CONT2 from the signal controller 600, the data driver 500 sequentially receives and shifts the digital image data DAT for one pixel row and selects the grayscale voltages corresponding to the digital image data DAT from the grayscale voltages supplied by the grayscale voltage generator 800, so that the image data DAT are converted into the associated data voltages. After that, the data voltages are applied to the associated data lines $D_1$ to $D_m$.

The gate driver 400 applies the gate-on voltage $V_{on}$ to the gate lines $G_1$ to $G_n$ according to the gate control signals CONT1 from the signal controller 600 to turn on the switching devices Q connected to the gate lines $G_1$ to $G_n$. As a result, the data voltages applied to the data lines $D_1$ to $D_m$ are applied to the associated pixels PX through the turned-on switching devices Q.

A difference between the data voltages applied to the pixel PX and the common voltage $V_{com}$ becomes a charge voltage of the liquid crystal capacitors $C_{LC}$, that is, a pixel voltage. Alignment of the liquid crystal molecules varies according to the intensity of the pixel voltage.

In units of one horizontal period (or 1H), that is, one period of the horizontal synchronization signal Hsync, the data deriver 500 and the gate driver 400 repetitively perform the aforementioned operations for the next pixel. In this manner, during one frame, the gate-on voltages $V_{on}$ are applied to all the gate lines $G_1$ to $G_n$, so that the data voltages are applied to all the pixels. When one frame ends, the next frame starts, and a state of the inversion signal RVS applied to the data driver 500 is controlled, so that the polarity of the data signal applied to each of the pixels is opposite to the polarity in the previous frame (frame inversion). At this time, even in one frame, according to the characteristics of the inversion signals RVS, the polarity of the data signal flowing through the one data line may be inverted (row inversion and dot inversion). In addition, the polarities of the data signals applied to the one pixel row may be different form each other (column inversion and dot inversion).

In exemplary embodiments of the display device, the light source units can be extracted from the display device without entirely dismantling the display device. As a result, the tasks of repairing and rework of the light source units can be easily performed.

According to exemplary embodiments of a backlight assembly, since light source units are inserted from an outer side of a fixing member into opening portion formed in the fixing member, tasks of rework of the light source units can be easily performed.

In another exemplary embodiment, since step portions of the light source units are fixed to the outer side of the fixing member, the light source units can be securely fixed to the fixing member.

In another exemplary embodiment, since the step portion of the light source units are closely attached to the fixing member, heat of the light source units can be efficiently released through the fixing member.

Since the light source units are assembled to the fixing member along guide rails thereof in a sliding manner, a process of assembling the backlight assembly can be further simplified.

Since a side wall portion and a bottom portion of the fixing member are detachable from each other, the fixing member can be easily dismantled. Accordingly, the tasks of rework of the light source units can be easily performed.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A backlight assembly comprising:
a plurality of light source units each comprising:
at least one light source emitting light; and
a printed circuit board on which the light source is mounted, the printed circuit board driving the light source; and
a substantially planar and continuous fixing member fixing the light source units, and comprising a bottom portion and a side wall portion formed extending from edges of the bottom portion, the printed circuit boards directly contacting the fixing member such that the printed circuit boards are spaced apart from one another;
wherein the light source units are each inserted from an outer side of the fixing member into an opening portion formed in the bottom portion of the fixing member, the light sources emitting light through the opening portions, such that the light sources are disposed protruding into an inner portion of the fixing member through the opening portions.

2. The backlight assembly of claim 1, wherein only the light source is disposed protruding through the opening portion.

3. The backlight assembly of claim 1, wherein the printed circuit board is constructed with a metal plate.

4. The backlight assembly of claim 3, wherein the metal plate is made of aluminum.

5. The backlight assembly of claim 1, wherein the each of the light source units further comprises a step portion formed along a periphery of the each light source unit, wherein the step portion is fixed on the outer side of the bottom portion of the fixing member.

6. The backlight assembly of claim 5, wherein the step portion is engaged with the bottom portion of the fixing member by screws.

7. The backlight assembly of claim 5, wherein the fixing member further comprises hooks extended from the bottom portion at a periphery of the opening portion of the fixing member, wherein the light source unit is fixed to the fixing member with the hooks.

8. The backlight assembly of claim 5, wherein the step portion is directly adjacent to the bottom portion of the fixing member.

9. The backlight assembly of claim 1, wherein the fixing member further comprises guide rails disposed at edges of the opening portion and disposed opposing the light source with respect to the printed circuit board, wherein the guide rails surround edges of the light source unit and the light source unit is inserted into the guide rails in a sliding manner.

10. The backlight assembly of claim 9, wherein the each of the light source units further comprises a step portion formed along a periphery of the each light source unit and disposed on the outer side of the bottom portion of the fixing member.

11. The backlight assembly of claim 9, wherein the opening portion is formed in the side wall portion and the bottom portion.

12. The backlight assembly of claim 1, further comprising a cover member covering the light source units and fixed at the outer side of the fixing member.

13. The backlight assembly of claim 1, wherein the light source is a light emitting diode (LED).

14. The backlight assembly of claim 1, wherein a portion of the printed circuit board is disposed in the opening portion of the fixing member.

15. The backlight assembly of claim 14, wherein the light source unit further comprises a step portion formed along a periphery of the light source unit, the step portion being disposed on the outer side of the bottom portion of the fixing member and continuous with the portion of the printed circuit board disposed in the opening portion of the fixing member.

16. A display device comprising:
   a panel unit displaying images; and
   a direct backlight assembly comprising:
      a plurality of light source units each comprising:
         a light source supplying light to the panel unit; and
         a printed circuit board including the light source mounted thereon, the printed circuit board driving the light source;
      a fixing member fixing the light source unit and comprising:
         an opening portion;
         a bottom portion in which the opening portion is formed; and
         a side wall portion continuous with the bottom portion and protruded from edges of the bottom portion;
      wherein each of the light source units is inserted from an outer side of the fixing member into the opening portion in the bottom portion of the fixing member and emits the light through the opening portion.

17. The display device of claim 16, wherein the printed circuit board comprises a metal plate.

18. The display device of claim 16, wherein the each of the light source units further comprises a step portion formed along a periphery of the each light source unit and disposed on the outer side of the bottom portion of the fixing member.

19. The display device of claim 16, the fixing member further comprising guide rails disposed at edges of the opening portion of the fixing member and disposed opposing the light sources with respect to the printed circuit board, wherein the guide rails surround a portion of the light source unit and the light source unit is inserted into the guide rails in a sliding manner.

20. The display device of claim 16, wherein the opening portion is formed to pass through the side wall portion and the bottom portion.

21. The display device of claim 16, wherein the panel unit is a liquid crystal display panel.

22. The display device of claim 16, wherein a portion of the printed circuit board is disposed in the opening portion of the fixing member.

* * * * *